(12) United States Patent
Navarro et al.

(10) Patent No.: US 10,377,287 B2
(45) Date of Patent: Aug. 13, 2019

(54) HEADREST FOR A VEHICLE

(71) Applicant: Adient Luxembourg Holding S.à.r.l., Luxembourg (LU)

(72) Inventors: Daniel Navarro, Haguenau (FR); Oliver Alber, Bad Teichnach Zavelstein (DE); Christian Schulz, Leichlingen (DE)

(73) Assignee: Adient Luxembourg Holding S.à.r.l., Luxembourg (LU)

( * ) Notice: Subject to any disclaimer, the term of this patent is extended or adjusted under 35 U.S.C. 154(b) by 37 days.

(21) Appl. No.: 15/324,893

(22) PCT Filed: Jul. 10, 2015

(86) PCT No.: PCT/EP2015/065902
§ 371 (c)(1),
(2) Date: Jan. 9, 2017

(87) PCT Pub. No.: WO2016/005594
PCT Pub. Date: Jan. 14, 2016

(65) Prior Publication Data
US 2017/0197528 A1 Jul. 13, 2017

(30) Foreign Application Priority Data

Jul. 10, 2014 (DE) .......... 10 2014 213 477
Oct. 17, 2014 (DE) .......... 10 2014 221 155

(51) Int. Cl.
*B60N 2/879* (2018.01)
*B60R 11/02* (2006.01)
(Continued)

(52) U.S. Cl.
CPC .......... *B60N 2/879* (2018.02); *B60R 11/0252* (2013.01); *B60N 2/891* (2018.02);
(Continued)

(58) Field of Classification Search
CPC ..... B60R 2011/0017; B60R 2011/0071; B60R 2011/0043; B60R 11/0235;
(Continued)

(56) References Cited

U.S. PATENT DOCUMENTS 2,464,435 A * 3/1949 Conradt .............. B60R 11/0217
297/397
3,156,500 A * 11/1964 Kerr .................... A61G 15/125
297/230.13
(Continued)

FOREIGN PATENT DOCUMENTS

CN 16 65 702 A 9/2005
CN 101 095 093 A 12/2007
(Continued)

OTHER PUBLICATIONS

JP,2009-067259,A 8 Page machine translation run Feb. 21, 2018.*
(Continued)

*Primary Examiner* — Robert Canfield
(74) *Attorney, Agent, or Firm* — McGlew and Tuttle, P.C.

(57) ABSTRACT

A headrest (1) for a vehicle has a headrest body (1.1). The headrest body (1.1) has a substantially C-shaped cross section. A holder (5), for holding at least one object (3), is arranged inside a hollow space (H) enclosed by the C-shaped cross section. The holder (5) is integral with the headrest body (1.1) and is formed by a molded portion, or several molded portions, of the headrest body (1.1), and/or by at least one mechanically flexible portion of the headrest body (1.1). The headrest body (1.1) is thereby configured such that the object (3) can be retained by a clamping between the limbs of the C-shaped cross section.

16 Claims, 28 Drawing Sheets

(51) Int. Cl.
 *B60N 2/80* (2018.01)
 *B60N 2/891* (2018.01)
 *B60N 2/90* (2018.01)
 *B60R 11/00* (2006.01)

(52) U.S. Cl.
 CPC .. *B60N 2002/899* (2018.02); *B60N 2002/905* (2018.02); *B60R 11/0235* (2013.01); *B60R 2011/0017* (2013.01); *B60R 2011/0043* (2013.01); *B60R 2011/0071* (2013.01)

(58) Field of Classification Search
 CPC ..... B60R 11/0252; B60N 2/803; B60N 2/806; B60N 2/4876; B60N 2002/4405; B60N 2002/4891
 USPC ... 297/188.01, 188.04, 188.06, 217.3, 217.4, 297/217.5, 396
 See application file for complete search history.

(56) References Cited

U.S. PATENT DOCUMENTS

| | | | | |
|---|---|---|---|---|
| 4,440,443 | A * | 4/1984 | Nordskog | A47C 7/38 297/397 |
| 5,694,468 | A * | 12/1997 | Hsu | B60R 11/0241 379/426 |
| 6,669,285 | B1 * | 12/2003 | Park | B60N 2/4876 297/217.3 |
| 6,739,654 | B1 * | 5/2004 | Shen | B60N 2/4876 297/188.04 |
| 6,899,365 | B2 * | 5/2005 | Lavelle | B60N 2/4876 296/37.15 |
| 7,040,697 | B1 * | 5/2006 | Tuccinardi | B60N 2/4876 297/188.04 |
| 7,245,274 | B2 * | 7/2007 | Schedivy | B60N 2/64 345/7 |
| 7,591,508 | B2 * | 9/2009 | Chang | B60R 11/0235 297/217.3 |
| 7,597,393 | B1 * | 10/2009 | Tuccinardi | B60R 11/0211 297/188.04 |
| 7,938,491 | B2 * | 5/2011 | Montuore | B60N 2/2851 297/397 |
| 8,096,613 | B2 * | 1/2012 | Gibson | B60N 2/2851 297/250.1 |
| 8,403,411 | B2 * | 3/2013 | Boyer, Jr. | B64D 11/06 297/217.3 |
| 8,449,031 | B2 * | 5/2013 | Chang | B60R 11/0235 297/217.3 |
| 8,740,301 | B2 * | 6/2014 | Liu | B60N 2/4876 297/217.1 |
| 9,469,400 | B1 * | 10/2016 | Irmen | B60N 2/4876 |
| 9,617,002 | B2 * | 4/2017 | Hommel | B60R 11/0235 |
| 9,656,579 | B2 * | 5/2017 | Nakata | B60N 2/48 |
| 2003/0184137 | A1 * | 10/2003 | Jost | B60N 2/4876 297/219.1 |
| 2004/0032543 | A1 * | 2/2004 | Chang | B60R 11/0235 348/837 |
| 2005/0099547 | A1 | 5/2005 | Vitito | |
| 2005/0140845 | A1 * | 6/2005 | Huang | B60R 11/0235 349/58 |
| 2005/0204596 | A1 * | 9/2005 | Peng | G09F 9/00 40/320 |
| 2006/0175879 | A1 * | 8/2006 | Chiang | B60R 11/0235 297/188.04 |
| 2008/0272634 | A1 * | 11/2008 | Vasquez | B60K 35/00 297/217.4 |
| 2009/0167977 | A1 * | 7/2009 | Lee | B60R 11/0235 349/58 |
| 2009/0322125 | A1 * | 12/2009 | Berger | B60R 11/00 297/188.04 |
| 2010/0133888 | A1 * | 6/2010 | Montuore | B60N 2/2851 297/397 |
| 2011/0049943 | A1 * | 3/2011 | Liu | B60N 2/4876 297/188.04 |
| 2012/0241572 | A1 | 9/2012 | McClain et al. | |
| 2012/0280542 | A1 * | 11/2012 | Wood | B60N 2/4876 297/180.1 |
| 2013/0009460 | A1 * | 1/2013 | Speach | B60R 11/02 307/9.1 |
| 2013/0119727 | A1 * | 5/2013 | Lavelle | B60N 2/4876 297/217.3 |
| 2014/0084648 | A1 | 3/2014 | Wen et al. | |
| 2014/0198473 | A1 * | 7/2014 | Shah | B64D 11/00151 361/809 |
| 2016/0009394 | A1 * | 1/2016 | Felske | B64D 11/0627 297/163 |
| 2017/0008434 | A1 * | 1/2017 | Chang | B60R 11/02 |
| 2017/0080876 | A1 * | 3/2017 | Chang | B60N 2/879 |
| 2017/0174146 | A1 * | 6/2017 | Kipp | B60N 2/2222 |
| 2017/0314732 | A1 * | 11/2017 | Minn | F16M 13/022 |

FOREIGN PATENT DOCUMENTS

| | | | |
|---|---|---|---|
| DE | 10 2011 120 876 A1 | 6/2013 | |
| JP | 5118890 B2 * | 1/2013 | ........... B60N 2/4876 |
| JP | 2014136575 A * | 7/2014 | ....... B60D 11/00151 |
| WO | 2005/038628 A2 | 4/2005 | |

OTHER PUBLICATIONS

Chinese PCT National Phase First Office Action for Application No. 20150037711.9 with English transaltion. 11 pages total, submitted by Applicant Aug. 29, 2018. The Office Action is dated Jun. 6, 2018. (Year: 2018).*

* cited by examiner

HEADREST FOR A VEHICLE

CROSS REFERENCE TO RELATED APPLICATIONS

This application is a United States National Phase Application of International Application PCT/EP2015/065902 filed Jul. 10, 2015, and claims the benefit of priority under 35 U.S.C. § 119 of German Applications 10 2014 213 477.3 filed Jul. 10, 2014, and 10 2014 221 155.7 filed Oct. 17, 2014, the entire contents of which are incorporated herein by reference.

FIELD OF THE INVENTION

The invention relates to a headrest for a vehicle.

BACKGROUND OF THE INVENTION

Vehicle headrests comprising a headrest body for realizing a supporting function for a head of a vehicle occupant are known in general from the prior art.

Furthermore, holding devices for holding objects on a headrest, said holding devices being mounted on the headrest, are known.

US 2014/0084648 A1 describes a display device for a vehicle, which display device comprises a display unit arranged in the region of a headrest arranged on a backrest of a vehicle seat. In order to accommodate the display unit, the rear side of the headrest comprises a recess corresponding to the display unit, wherein the recess is designed in such a manner that the display unit can slide in the recess in the vertical or horizontal direction and is removable from the recess, and is arrangeable therein, in the vertical or horizontal direction by means of a sliding movement.

SUMMARY OF THE INVENTION

It is an object of the present invention to specify a headrest which is improved in relation to the prior art.

The headrest according to the invention for a vehicle comprises a headrest body, wherein the headrest body has a substantially C-shaped cross section, and a holding device for holding at least one object is arranged within a cavity enclosed by the C-shaped cross section. In this case, the holding device is an integral part of the headrest body and is formed by one molded portion or a plurality of molded portions of the headrest body and/or by at least one mechanically flexible portion of the headrest body, wherein the headrest body is configured in such a manner that the object is holdable by means of clamping between limbs of the C-shaped cross section.

The advantages obtained with the invention consist in particular in that no additional holding device for holding the object has to be mounted on the headrest. At the same time, a safety function of the headrest and an optical view of same are not impaired.

A development of the headrest makes provision for the at least one mechanically flexible portion of the headrest body to be configured in such a manner that said portion is deformed, during the arrangement of the object, to form one molded portion or a plurality of molded portions, and therefore the object is holdable by means of clamping between the limbs of the C-shaped cross section. The headrest body here at the same time has sufficient rigidity in order to meet its supporting function to support a head of a vehicle occupant. In this connection, safety-relevant properties and optical properties of the headrest are not impaired by the mechanically flexible design of the at least one portion of the headrest body.

In a possible refinement of the headrest, the holding device comprises at least one elongate depression introduced into at least one portion of the headrest body in a manner running substantially perpendicularly to the C-shaped cross section. The object can be inserted into this depression in the C-shaped cross section and is securely held by clamping on account of an elastic and nevertheless stiff design of the headrest body.

In a further possible refinement, the holding device comprises elongate depressions introduced into at least one portion of the headrest body in a manner running substantially perpendicularly to the C-shaped cross section and substantially parallel to one another. The object is also inserted here into a depression in the C-shaped cross section and is held by clamping on account of an elastic and nevertheless stiff design of the headrest body. Owing to the plurality of depressions, first of all, when the object is configured as a screen, an inclination thereof is adjustable within the cavity of the headrest body and, secondly, when the distance between limbs of the C-shaped cross section changes, objects having different dimensions are arrangeable and fastenable within the cavity.

According to a development, the holding device comprises at least one fastening structure attached to at least one portion of the headrest body and which comprises, for example, a web-like structure and/or a stud-like structure. A fastening structure of this type likewise permits secure fastening of the object in the cavity of the headrest. In particular in the case in which the fastening structure is attached to a cover of the headrest or is part of said cover, adaptation to different objects to be fastened is easily possible by means of different covers while the basic body of the headrest body remains the same.

In a possible refinement, the fastening structure comprises web-like structures and/or stud-like structures running parallel next to one another and substantially perpendicularly to the C-shaped cross section. This arrangement first of all makes it possible, when the object is configured as a screen, for an inclination thereof to be adjustable within the cavity of the headrest body and, secondly, when the distance between limbs of the C-shaped cross section changes, for objects of different dimensions to be arrangeable and fastenable within the cavity.

In a further possible refinement, part of the holding device is formed by means of an add-on part fastened to the headrest body. Such an add-on part makes it possible in a particularly advantageous manner for the holding device to be able to be adapted to different objects and different dimensions of the objects in a simple manner even retrospectively.

For example, the add-on part comprises at least one edge running substantially perpendicularly to the C-shaped cross section or forms said edge, wherein the edge firstly permits a simple arrangement of the object and secondly secure holding of same within the cavity, in particular by clamping.

In a possible refinement, the edge is formed on an actuable button in the unactuated state. This results in a particularly advantageous manner in the edge being able to be eliminated when the button is actuated and the object being able to be removed and introduced into the cavity in a particularly simple manner.

According to a further possible refinement the add-on part comprises at least one positioning element which facilitates positioning and alignment of the object.

Exemplary embodiments of the invention are explained in more detail below with reference to drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
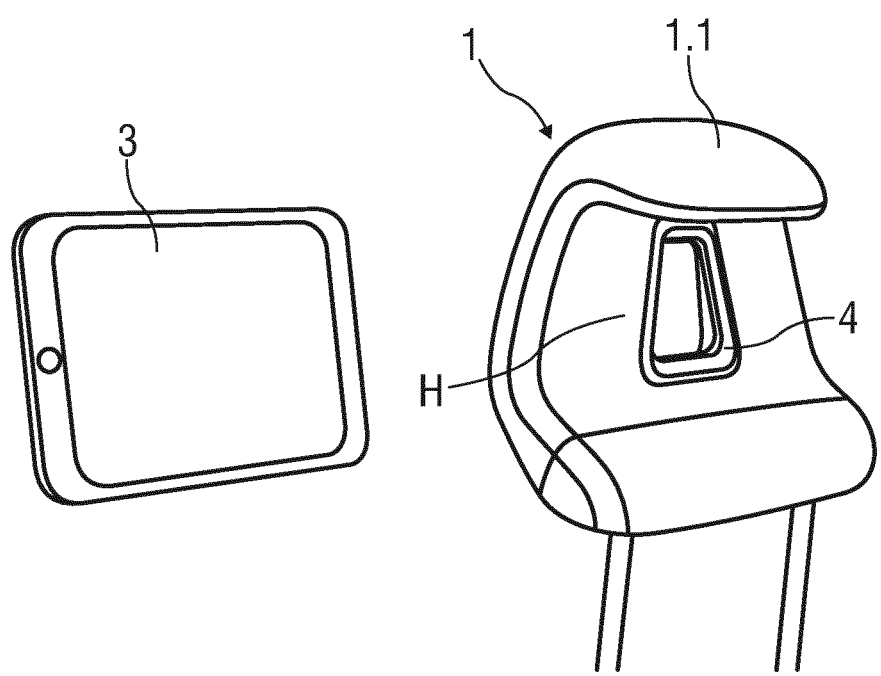
FIG. 1 is a schematic perspective view of a headrest and of an object to be fastened to the headrest.

Referring to the drawings, mutually corresponding parts are provided with the same reference signs in all of the Figures.

FIG. 1 is an illustration, in a perspective view of a rear side, of a headrest 1 for a vehicle seat 2 illustrated in more detail in FIGS. 20 to 25 and an object 3 to be fastened to the headrest 1.

The object 3 is what is referred to as a tablet computer.

Figure 2:
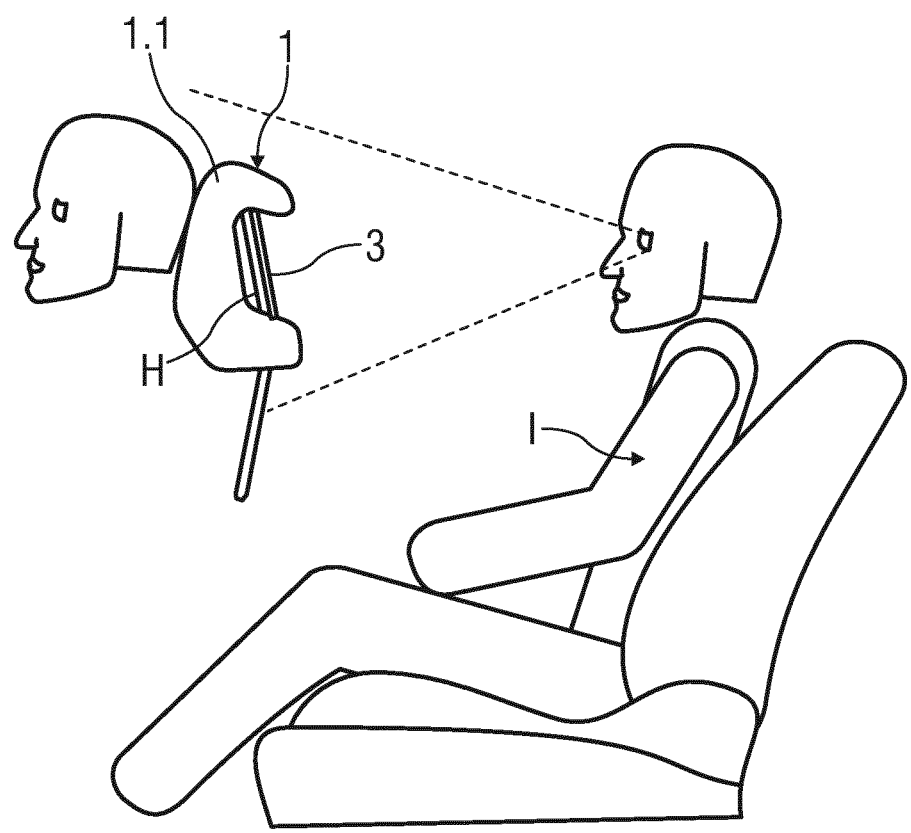
FIG. 2 is a schematic side view of a cutout of a vehicle interior.

The headrest 1 comprises a headrest body 1.1 which is formed from a stiff foam material and is provided for supporting a head of a vehicle occupant I, illustrated in more detail in FIG. 2.

Furthermore, an add-on part 4 which surrounds an opening, which is formed in the headrest body 1.1, in the shape of a frame is arranged on the headrest 1.

The headrest body 1.1 has a cross section which is of substantially C-shaped design and encloses a cavity H.

In order to realize a comfortable posture for the vehicle occupant I when using the object 3 to record visual content, the headrest body 1.1 is configured in such a manner that the object 3 is fastenable to the headrest body 1.1 in the region of the cavity H.

This is illustrated in FIG. 2

Figure 3:
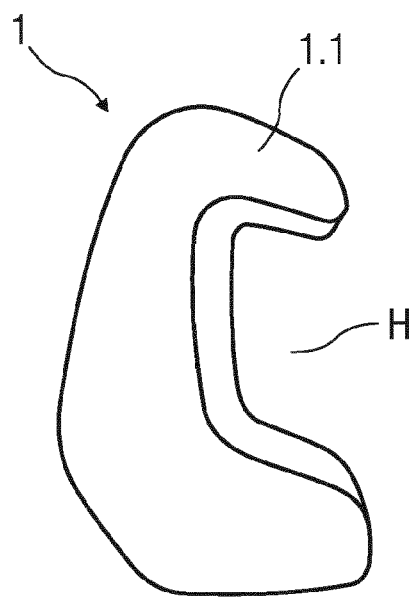
FIG. 3 is a schematic cross sectional view of a first exemplary embodiment of a headrest.
Figure 4:
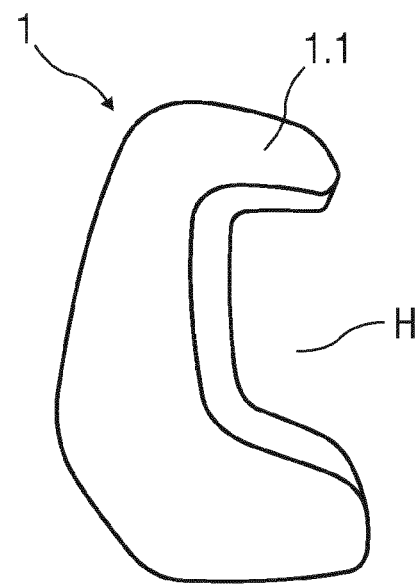
FIG. 4 is a schematic cross sectional view of a second exemplary embodiment of a headrest.

FIGS. 3 and 4 illustrate cross sections of a first and a second exemplary embodiment of the headrest 1, wherein the headrest bodies 1.1 have different dimensions and are therefore suitable for receiving objects 3 of different sizes.

Figure 5:
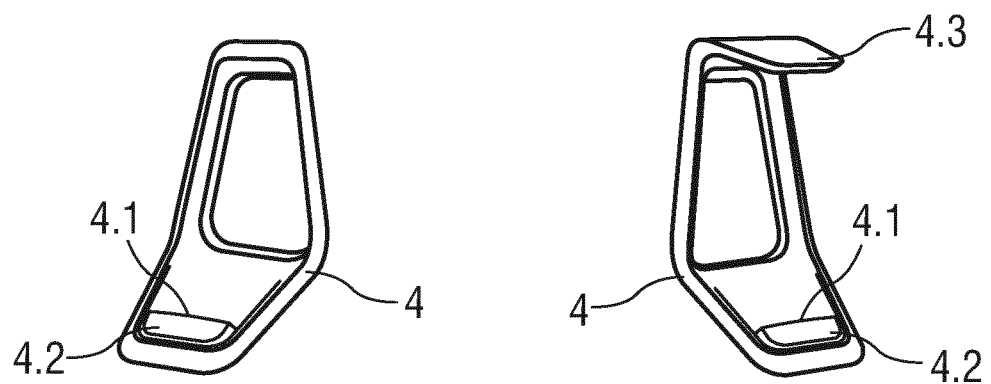
FIG. 5 is a schematic perspective view of a third exemplary embodiment of a headrest and various exemplary embodiments of an add-on part of the headrest.
Figure 5:
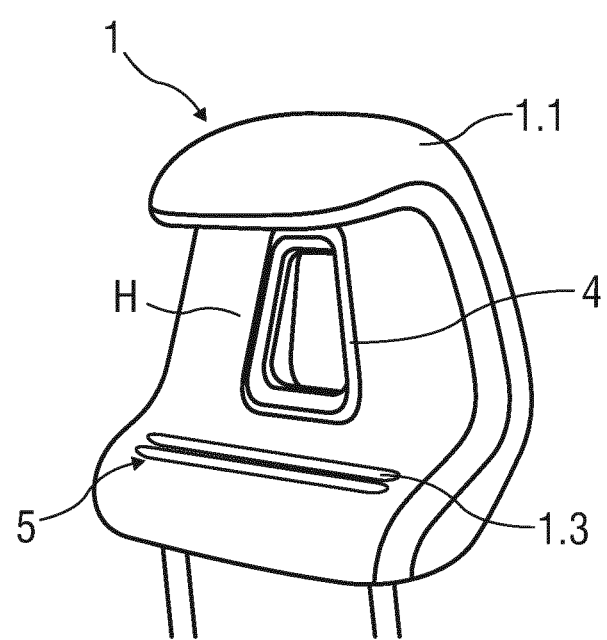
Figure 6:
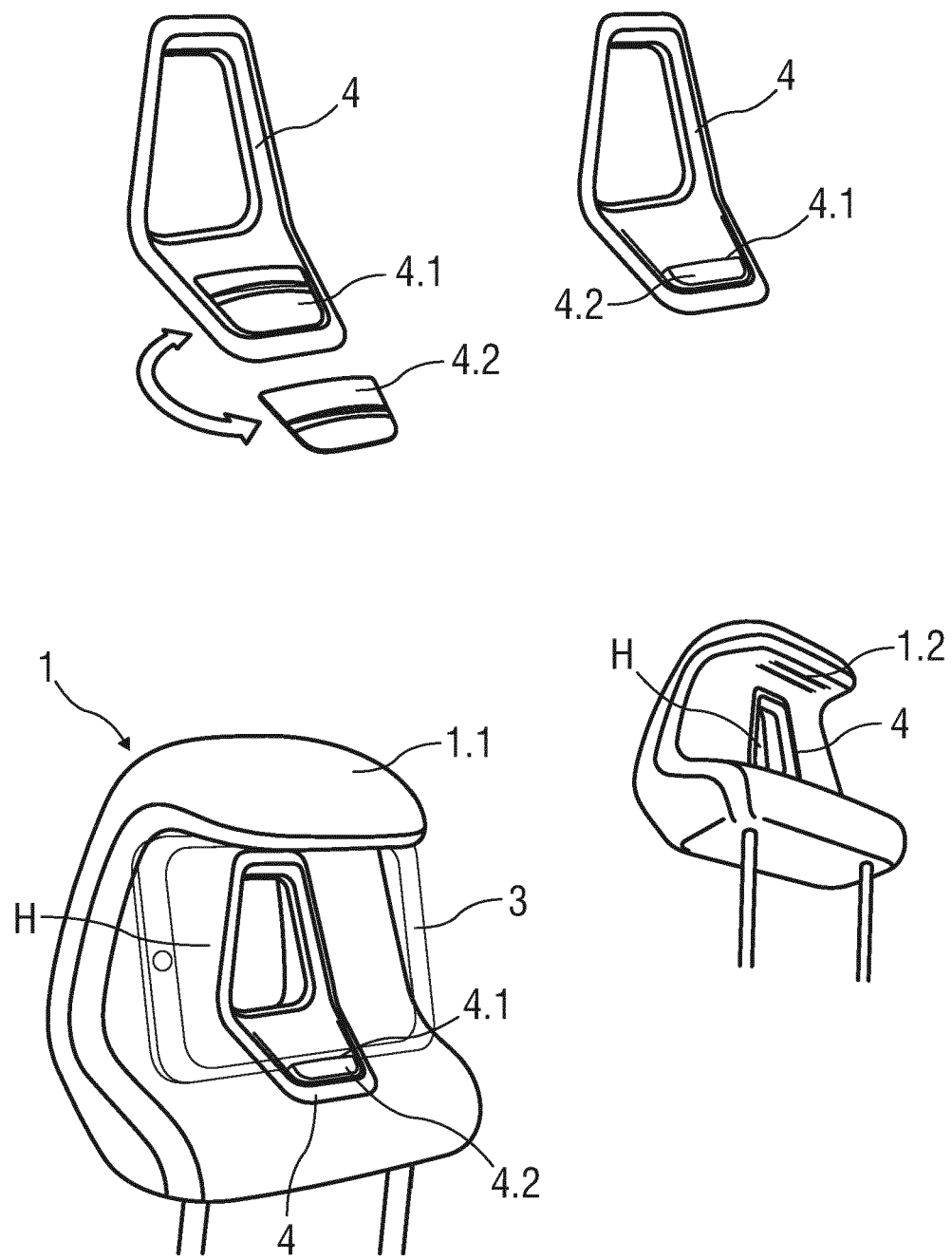
FIG. 6 is various schematic perspective views of a fourth exemplary embodiment of a headrest and various exemplary embodiments of an add-on part of the headrest.
Figure 7:
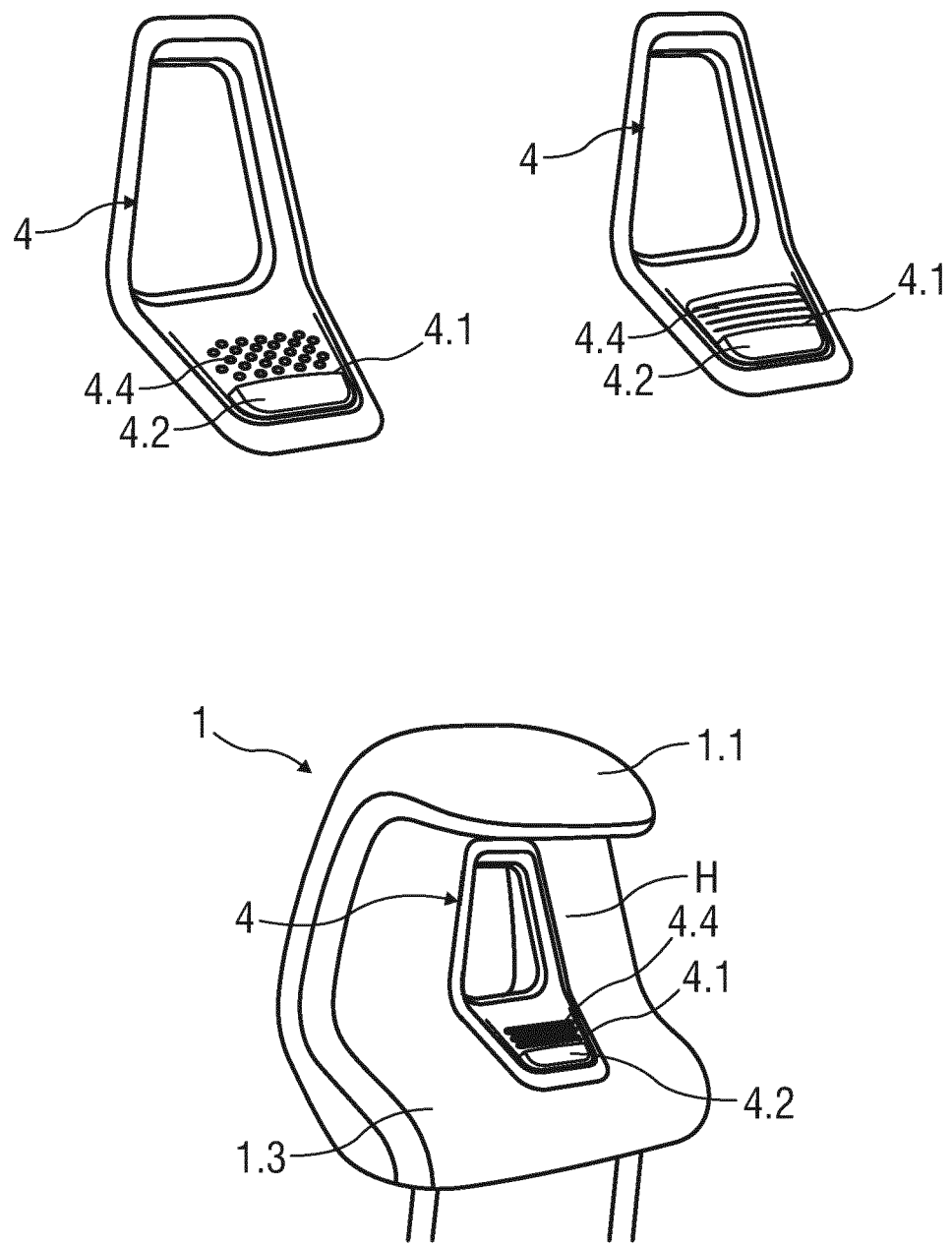
FIG. 7 is various perspective views of a fifth exemplary embodiment of a headrest and various exemplary embodiments of an add-on part of the headrest.

FIGS. 5 to 7 show, in various views, different exemplary embodiments of the headrest 1 and various exemplary embodiments of the add-on part 4.

For the fastening of the object 3, a holding device 5 for holding the object 3 is arranged within the cavity H enclosed by the C-shaped cross section. The holding device 5 here is an integral part of the headrest body 1.1 and is formed by one molded portion or a plurality of molded portions of the headrest body 1.1.

For the fastening of the object, the latter is inserted preferably laterally into the cavity H between the two limbs of the C-shaped cross section and secured by means of the holding device 5.

A possible exemplary embodiment of an add-on part 4 made of plastic is shown in the top left part of the illustration in FIG. 5. In this design, a lower portion 4.1 of the add-on part 4 forms part of the holding device 5, and an upper portion 1.2 (illustrated in more detail in FIG. 6) of the headrest body 1.1 forms a second part of the holding device 5. In particular, an edge is formed by means of the lower portion 4.1 of the add-on part 4. The upper portion 1.2 of the headrest body 1.1 is formed by elongate depressions running substantially perpendicularly to the C-shaped cross section and introduced into the foam material. The object 3 is inserted into said depressions, and lying against the edge thereof, in the C-shaped cross section and is held by clamping on account of an elastic and nevertheless stiff design of the headrest body 1.1. In order to be able to eliminate the clamping and to remove the object 3 again in a simple manner, the edge on the lower portion 4.1 of the add-on part 4 is formed by a button 4.2, and therefore the edge can be eliminated when the button 4.2 is actuated, and the object 3 can be removed.

FIG. 5 illustrates, in the bottom part, a headrest 1 in which the holding device 5 is formed completely by a lower portion 1.3 and the upper portion 1.2 (illustrated in more detail in FIG. 6) of the headrest body 1.1. The lower portion 1.3 is also formed here by elongate depressions running substantially perpendicularly to the C-shaped cross section and introduced into the foam material. The object 3 is also inserted here into the depressions in the C-shaped cross section and is held by clamping on account of an elastic and nevertheless stiff design of the headrest body 1.1.

A possible further exemplary embodiment of the add-on part 4 made of plastic is shown in the upper right part of the illustration in FIG. 5. In contrast to the exemplary embodiment shown in the left part of the illustration, the upper part of the holding device 5 is additionally formed by an upper portion 4.3 of the add-on part 4. The upper portion 4.3 of the add-on part 4 is formed here, in a manner not illustrated specifically, by elongate depressions running substantially perpendicularly to the C-shaped cross section. The securing of the object 3 in the holding device 5 and the removal of same therefrom respectively take place in the described manner by the object being pushed into the depressions and the button 4.2 being actuated.

FIG. 6 shows a possible further exemplary embodiment of the add-on part 4 made from plastic in the upper left part of the illustration. In contrast to the exemplary embodiment shown in the upper left part of the illustration in FIG. 5, the button 4.2 is formed in an exchangeable manner, and therefore buttons 4.2 having differently arranged elongate depressions for receiving differently shaped objects 3 or objects 3 with different dimensions are arrangeable on the headrest body 1.1.

FIG. 7 shows possible further exemplary embodiments of the add-on part 4 made of plastic. In contrast to the exemplary embodiment shown in the upper left part of the illustration in FIG. 5, positioning elements 4.4 formed in particular from rubber or plastic are additionally arranged in the lower portion 4.1 and facilitate positioning and alignment of the object 3.

Figure 8:
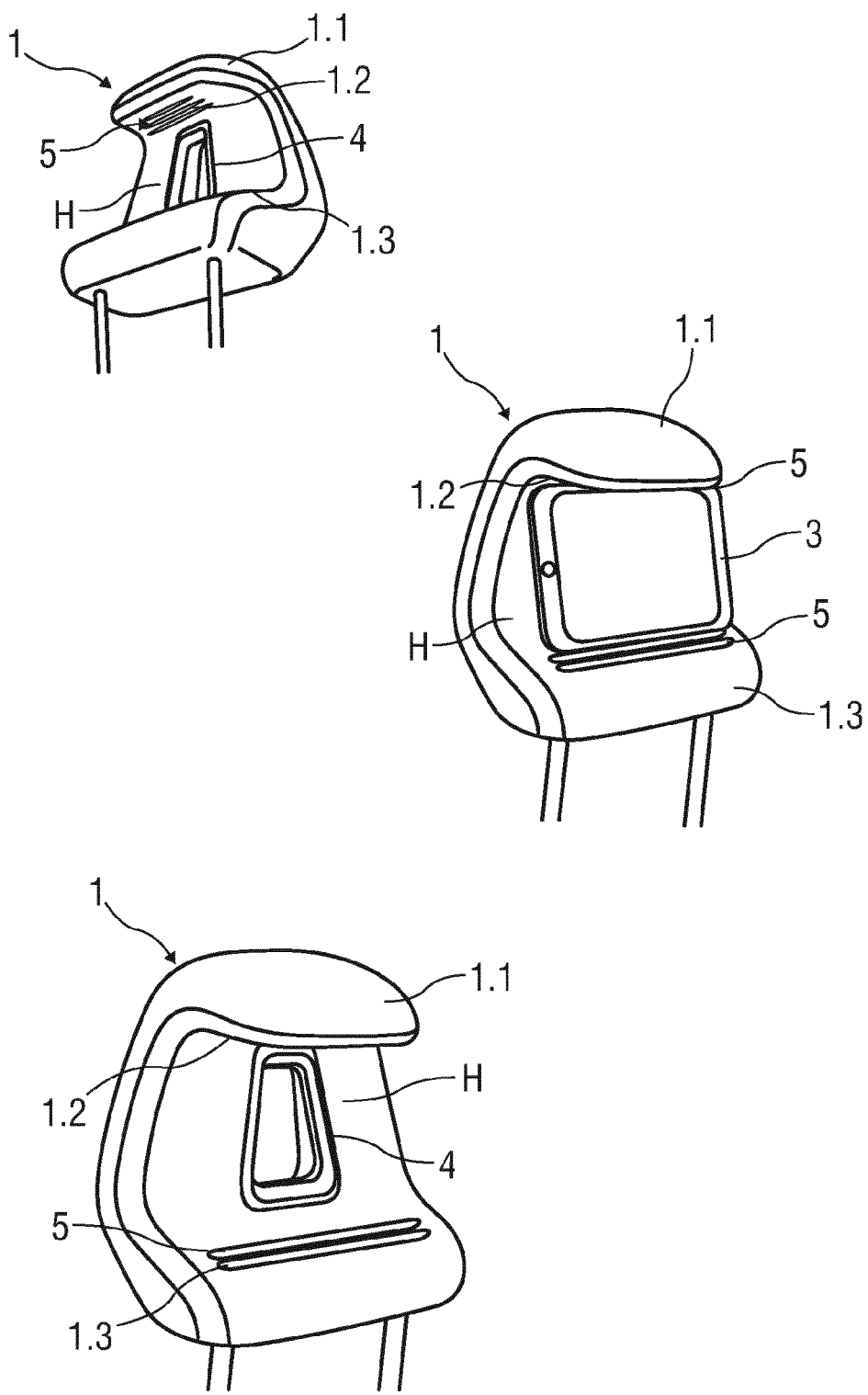
FIG. 8 is various schematic perspective views of a sixth exemplary embodiment of a headrest and also a fastening of an object to the headrest.

The exemplary embodiment of the headrest 1 illustrated in the lower part in FIG. 5 is illustrated in various views in FIG. 8, wherein the holding device 5 is completely formed by the lower portion 1.3 and the upper portion 1.2 of the headrest body 1.1.

Figure 9:
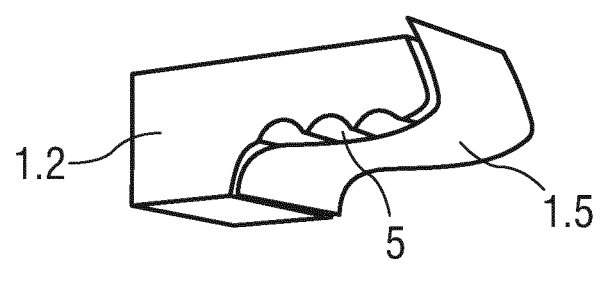
FIG. 9 is schematic sectional illustrations of partial regions of a headrest with a first design of a holding device.
Figure 9:
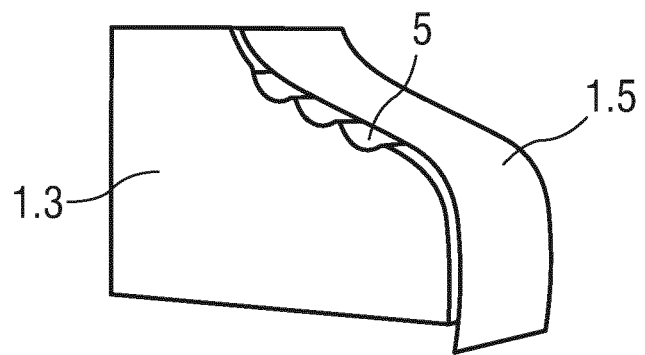
Figure 10:
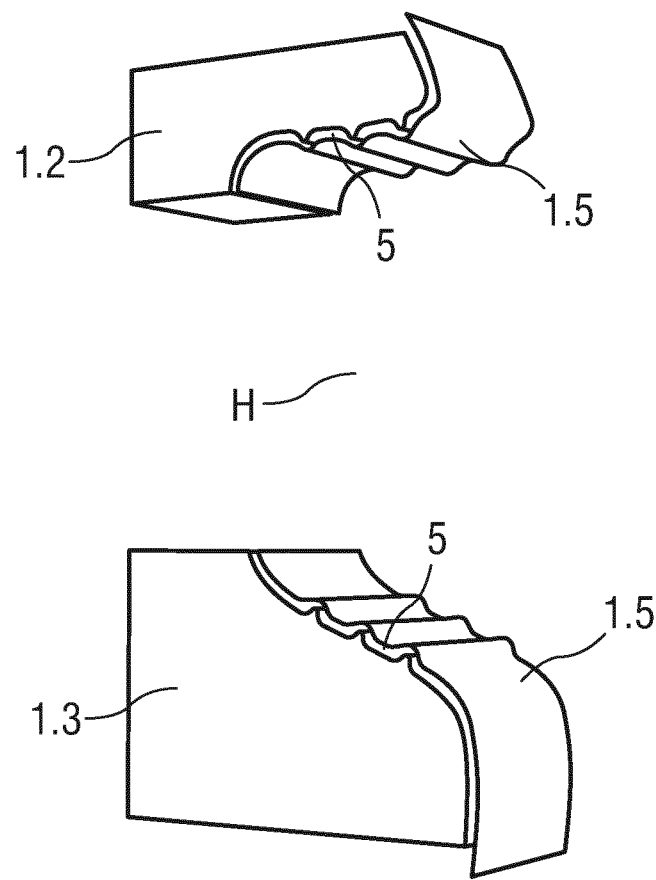
FIG. 10 is schematic sectional illustrations of partial regions of a headrest with a second design of a holding device.

FIGS. 9 and 10 each show, in sectional illustrations, the upper and lower portions 1.2, 1.3 of the headrest 1 with various designs of the holding device 5.

The depressions are in each case introduced here into the foam material. The difference between the two designs resides in the fact that, in the first design (FIG. 9) a cover 1.5 of the headrest body 1.1 is arranged tautly over the depressions, and therefore the latter are not visible, and, in the second design (FIG. 10), said cover is arranged so as to run in a manner corresponding to the depressions.

In exemplary embodiments (not illustrated specifically) of the headrest 1, it is provided that the upper and/or lower portion 1.2, 1.3 of the headrest body 1.1 are in each case configured as a mechanically flexible portion of the headrest body 1.1 in such a manner that said portion is deformed, during the arrangement of the object 3, to form one or more molded portions, in particular depressions, and therefore the object is held by means of clamping between the limbs of the C-shaped cross section. For example, the mechanically flexible portions of the headrest body 1.1 are formed for this purpose from a gel material.

Figure 11:
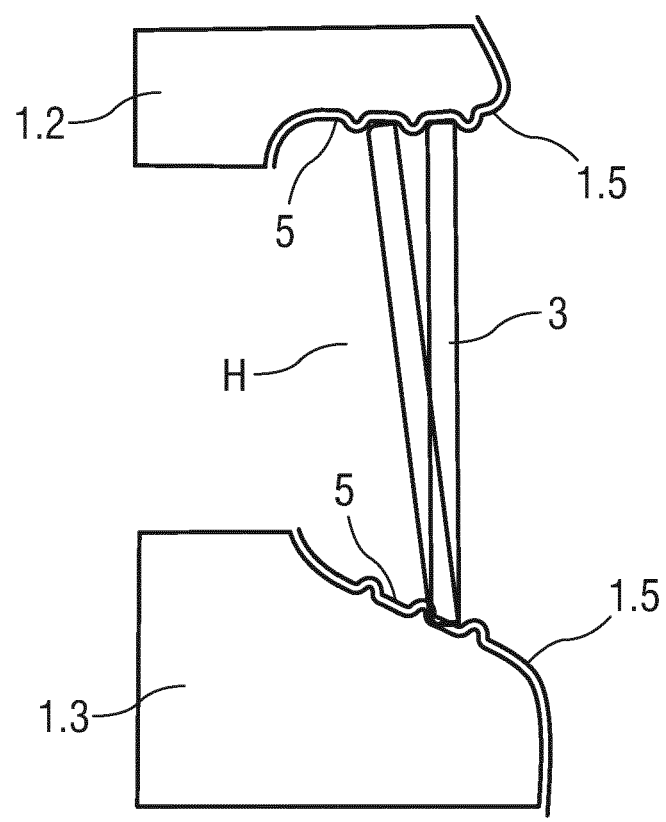
FIG. 11 is schematic sectional illustrations of partial regions of a headrest with a possible design of an object to be fastened.
Figure 12:
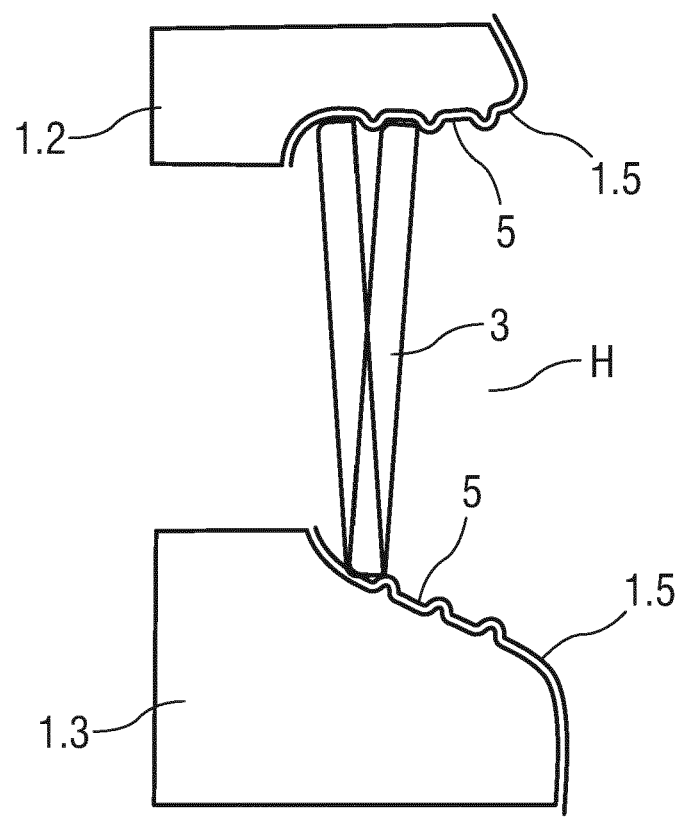
FIG. 12 is schematic sectional illustrations of partial regions of a headrest with a possible further design of an object to be fastened.

FIGS. 11 and 12 each illustrate, in sectional illustrations, the upper and lower portion 1.2, 1.3 of the headrest 1 and objects 3 of different dimensions. Owing to the C-shaped design of the cross section of the headrest body 1.1 and owing to the design of a plurality of elongate depressions running parallel next to one another substantially perpendicularly to the C-shaped cross section and introduced into the foam material, the holding device 5 is configured in such a manner that objects 3 of different dimensions can be arranged in different positions in the holding device 5.

Figure 13:
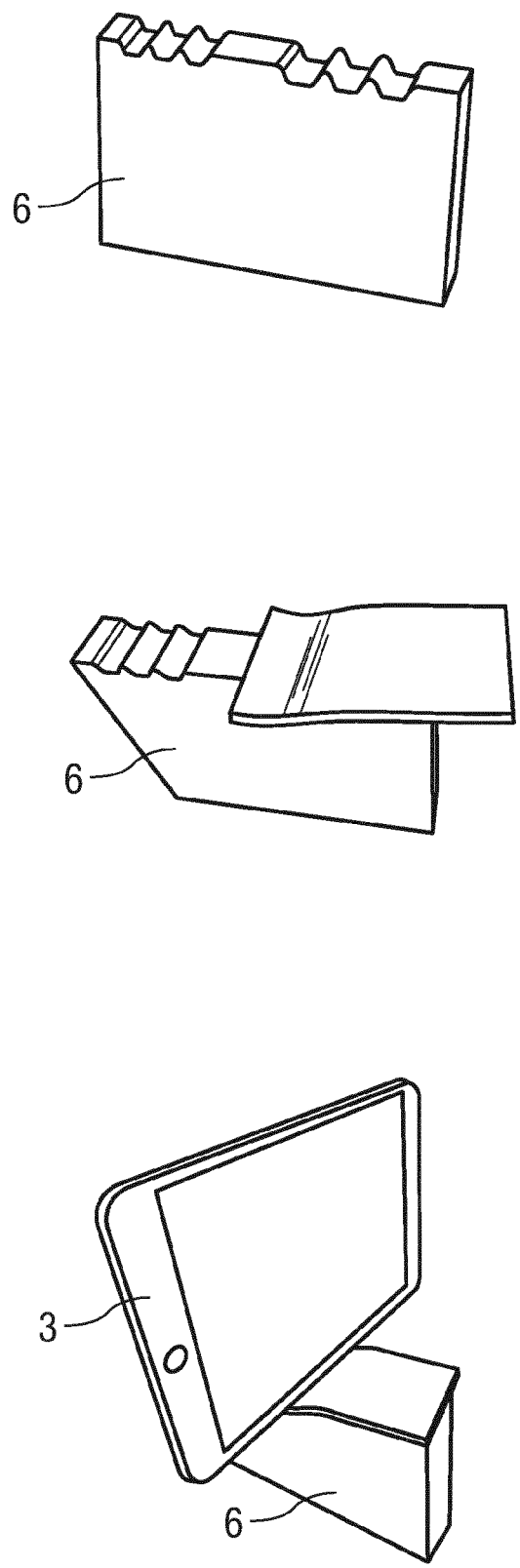
FIG. 13 is various schematic perspective illustrations of a model for simulating a holding device of a headrest.

FIG. 13 shows a model 6 for simulating the holding device 5, in various views.

Figure 14:
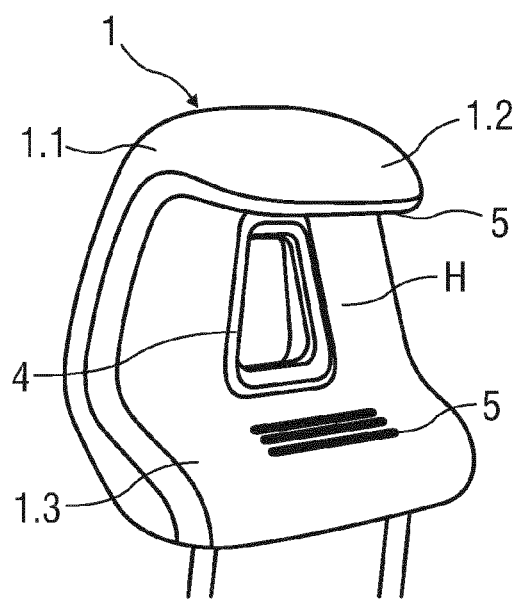
FIG. 14 is schematic perspective views of a seventh and eighth exemplary embodiment of a headrest and also a possible design of a holding device.
Figure 14:
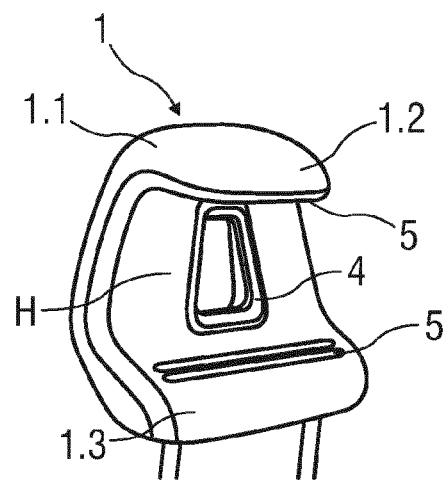
Figure 14:
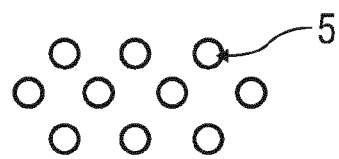

FIG. 14 illustrates various exemplary embodiments of the headrest 1 and also possible designs of the holding device 5. In a departure from the introduction of depressions, the holding device 5 is formed by fastening structures which are attached to the upper and the lower portion 1.2, 1.3, are formed in particular from rubber or plastic and are formed in the manner illustrated from a plurality of web-like structures or stud-like structures running parallel next to one another and substantially perpendicularly to the C-shaped cross section.

Figure 15:
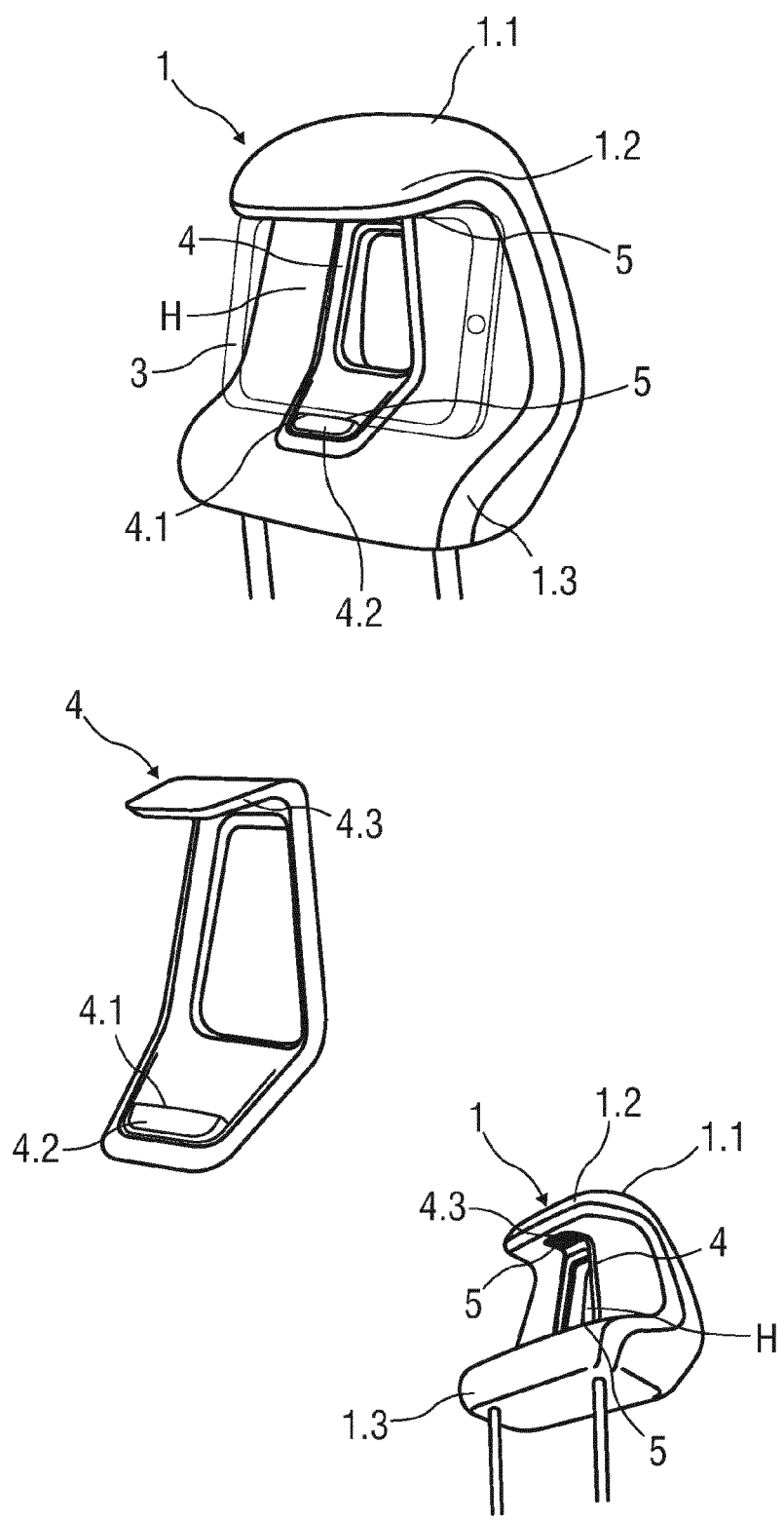
FIG. 15 is schematic perspective views of a ninth exemplary embodiment of a headrest and also of an add-on part of the headrest.

FIG. 15 shows, in perspective views, a possible exemplary embodiment of the headrest 1 with the exemplary embodiment of the add-on part 4 that is shown in the upper right part of the illustration in FIG. 5.

Figure 16:
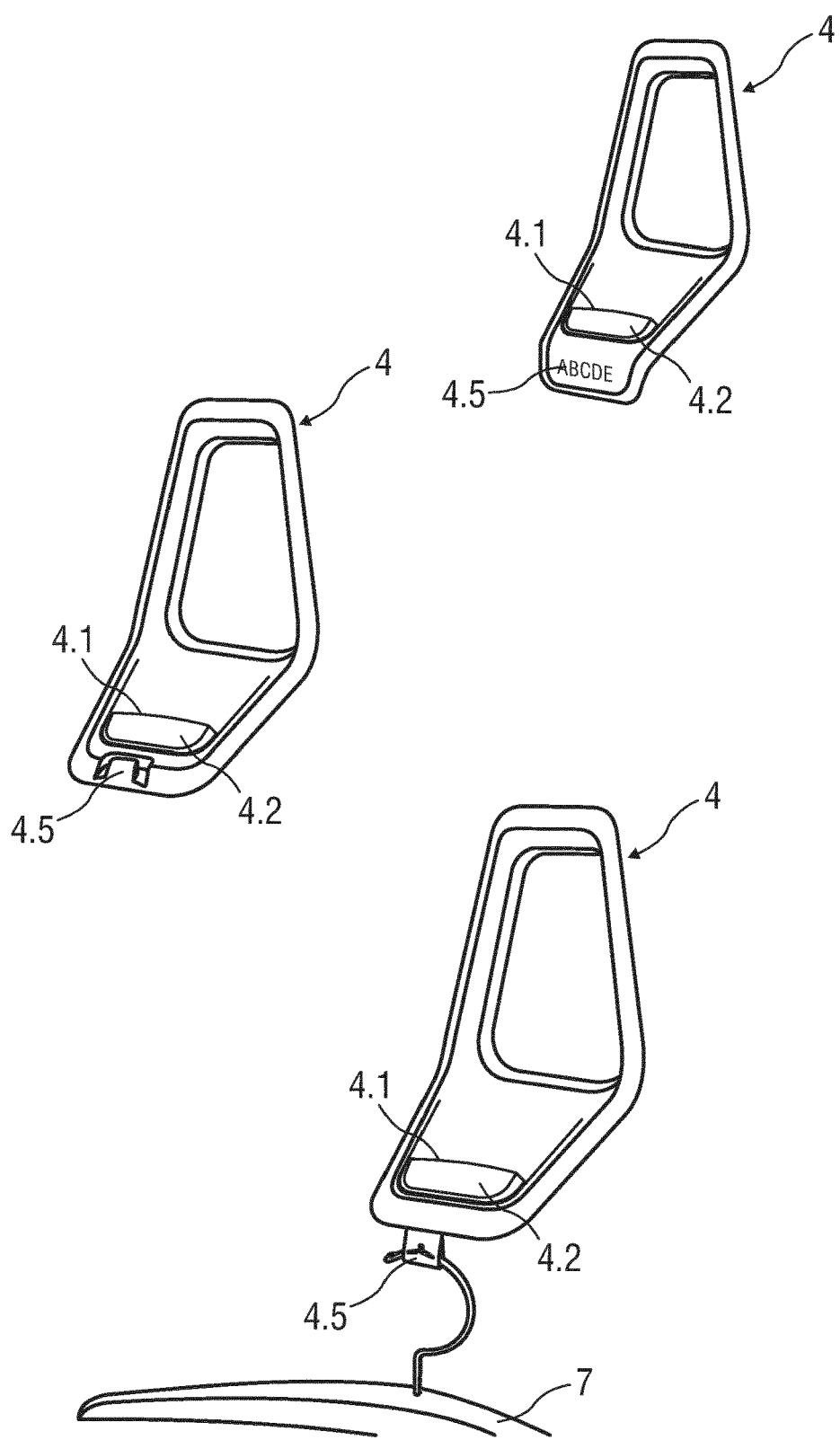
FIG. 16 is schematic perspective views of three exemplary embodiments of an add-on part for a headrest.

FIG. 16 illustrates possible further exemplary embodiments of the add-on part 4, wherein these exemplary embodiments differ from the exemplary embodiment shown in the upper left part of the illustration in FIG. 5 in that the add-on parts 4 have a further functional element 4.5 in the lower portion 4.1. Said functional element 4.5 is configured as a place holder for lettering (upper illustration), as a clothes hook (middle illustration) or as an eyelet for hanging up a clothes hanger 7 (lower illustration).

Figure 17:
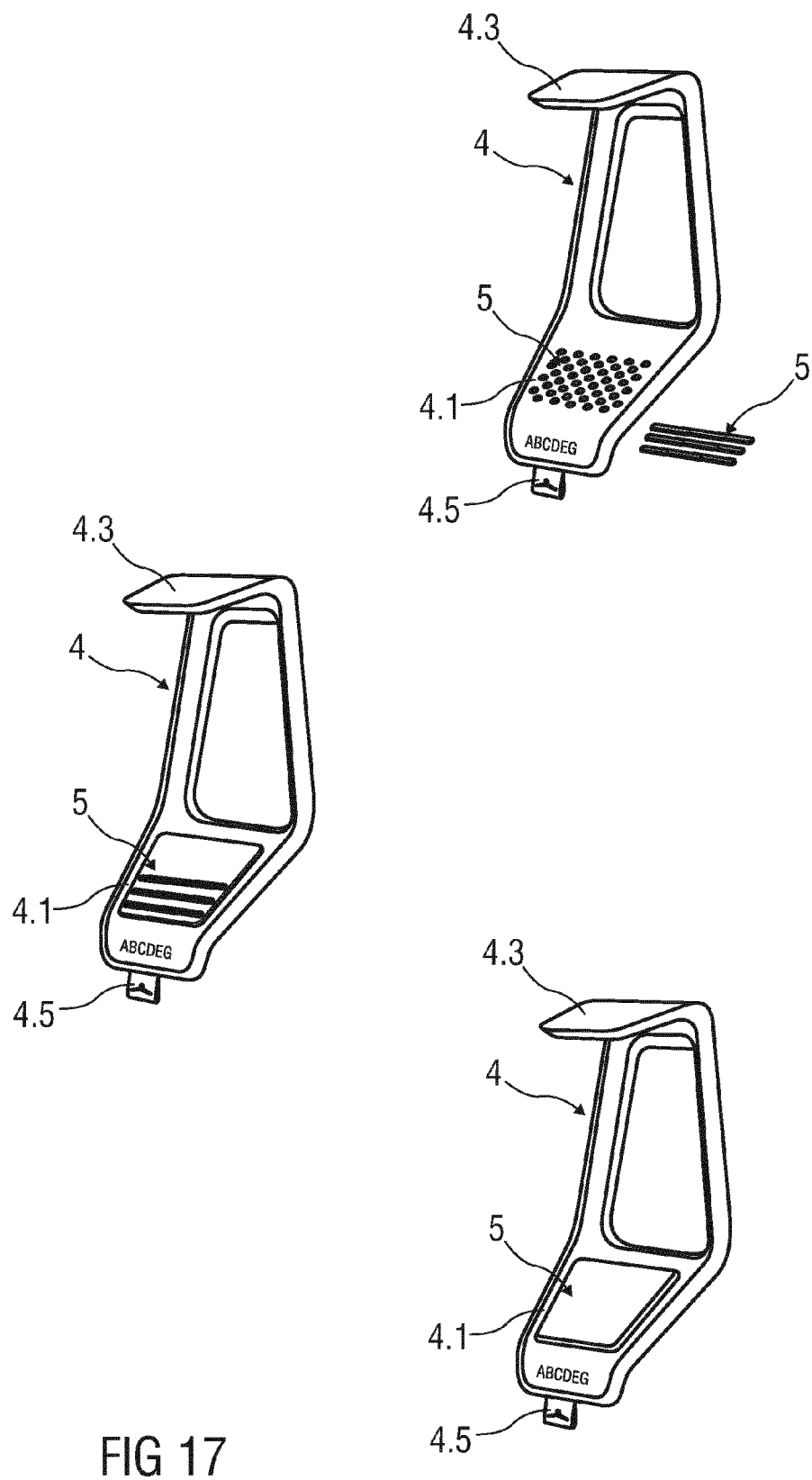
FIG. 17 is schematic perspective views of three further exemplary embodiments of an add-on part for a headrest.

FIG. 17 shows possible further exemplary embodiments of the add-on part 4, wherein these exemplary embodiments differ from the exemplary embodiment shown in the bottom illustration in FIG. 16 in that, instead of the button 4.2 in the lower portion 4.1 of the add-on part 4, the holding device 5 is formed by fastening structures which are formed in particular from rubber or plastic on the lower portion 4.1. Said fastening structures are configured as a stud-like structure (upper left illustration) or a plurality of web-like structures running parallel next to one another and substantially perpendicularly to the C-shaped cross section.

As an alternative, the web-like fastening structures running parallel next to one another and substantially perpendicularly to the C-shaped cross section are arranged on a mat-shaped base (middle illustration), or the base is configured in a mechanically flexible manner such that the latter is deformed, during the arrangement of the object 3, to form one or more molded portions, in particular depressions, and therefore the object is held by means of clamping between the limbs of the C-shaped cross section (lower illustration). For example, the base is formed for this purpose from a gel material.

Figure 18:
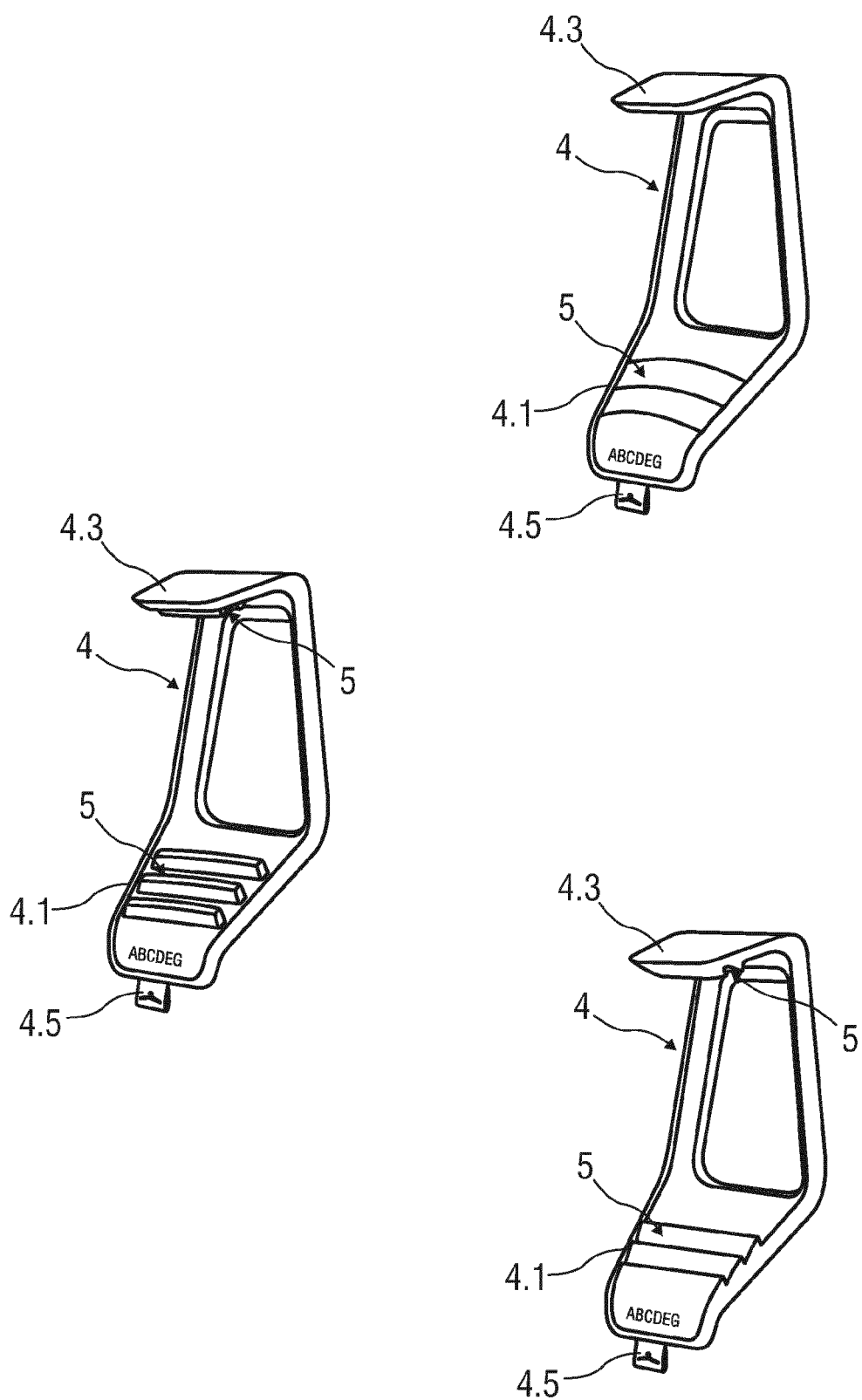
FIG. 18 is schematic perspective views of three further exemplary embodiments of an add-on part for a headrest.

FIG. 18 illustrates possible further exemplary embodiments of the add-on part 4, wherein different designs of the holding device 5 are arranged in the lower and/or upper portion 4.1, 4.3 of the add-on part 4.

In the exemplary embodiment shown in the upper illustration, a plurality of depressions running parallel next to one another and substantially perpendicularly to the C-shaped cross section are introduced in the lower portion 4.1 as part of the holding device 5.

In the exemplary embodiment shown in the middle illustration, a plurality of web-like structures running parallel next to one another and substantially perpendicularly to the C-shaped cross section and formed in particular from rubber or plastic are attached in the lower and upper portions 4.1, 4.3 as part of the holding device 5.

In the exemplary embodiment shown in the bottom illustration, a plurality of depressions running parallel next to one another and substantially perpendicularly to the C-shaped cross section are introduced in the lower and upper portions 4.1, 4.3 as part of the holding device 5.

Figure 19:
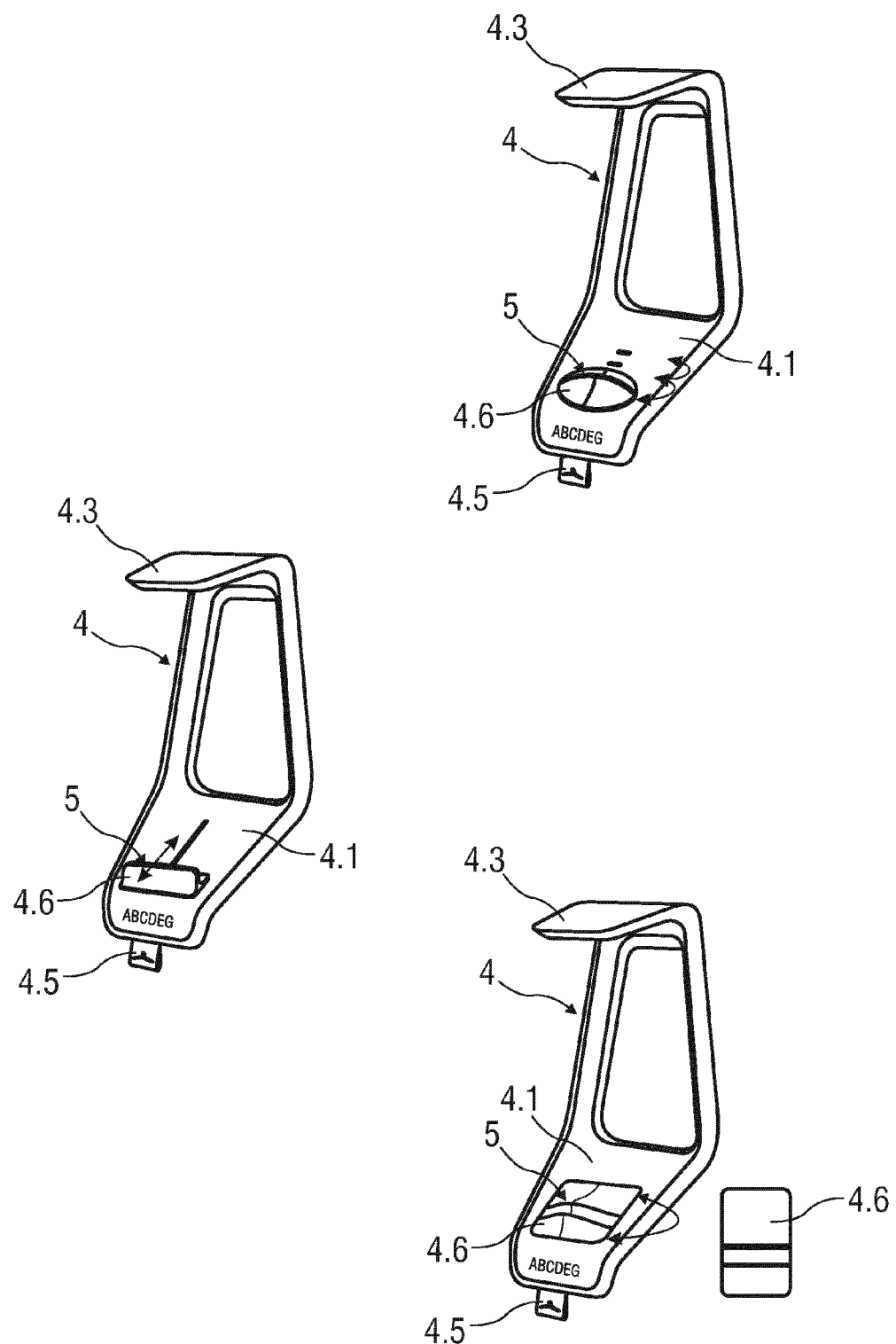
FIG. 19 is schematic perspective views of three further exemplary embodiments of an add-on part for a headrest.

FIG. 19 shows possible further exemplary embodiments of the add-on part 4, wherein different designs of the holding device 5 are arranged in the lower portion 4.1 of the add-on part 4.

In the exemplary embodiment shown in the upper illustration, a holding element 4.6 which is securable in three positions on the add-on part 4 and forms the edge for holding the object 3 is arranged in the lower portion 4.1 as part of the holding device 5. Owing to the possibility of arranging the holding element 4.6 in the various positions, objects of different sizes are arrangeable within the C-shaped cross section of the headrest body 1.1.

In the exemplary embodiment shown in the middle illustration, a holding element 4.6 which is displaceable in an infinitely variable manner or into different positions in stages and is securable on the add-on part 4 and which forms the edge for holding the object 3 is arranged in the lower portion 4.1 as part of the holding device 5.

In the exemplary embodiment shown in the bottom illustration, a holding element 4.6 which is securable on the add-on part 4 and which has a depression forming the edge is arranged in the lower portion 4.1 as part of the holding device 5. The depression is arranged here in such a manner that the holding element 4.6 is formed asymmetrically. By rotation of said holding element, an arrangement of the edge at different positions is therefore likewise possible.

Figure 20:
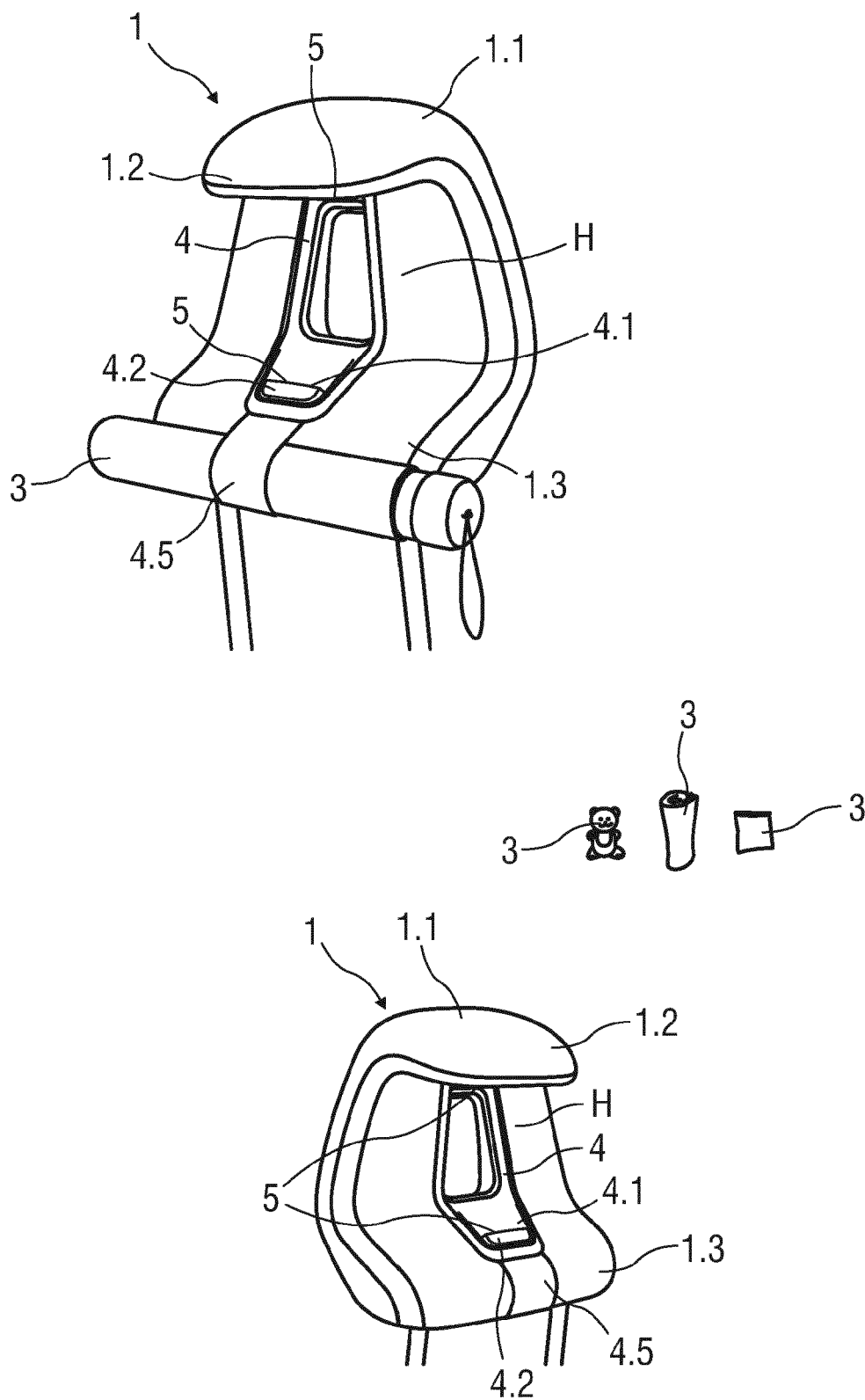
FIG. 20 is schematic perspective views of a tenth exemplary embodiment of a headrest.

FIG. 20 shows a further exemplary embodiment of the headrest 1 in various views, wherein the headrest 1 differs from the exemplary embodiment illustrated in FIG. 6 in that the add-on part 4 has a further functional element 4.5 in the lower portion 4.1. Said functional element 4.5 is configured as an elastic strap for securing various objects 3.

Figure 21:
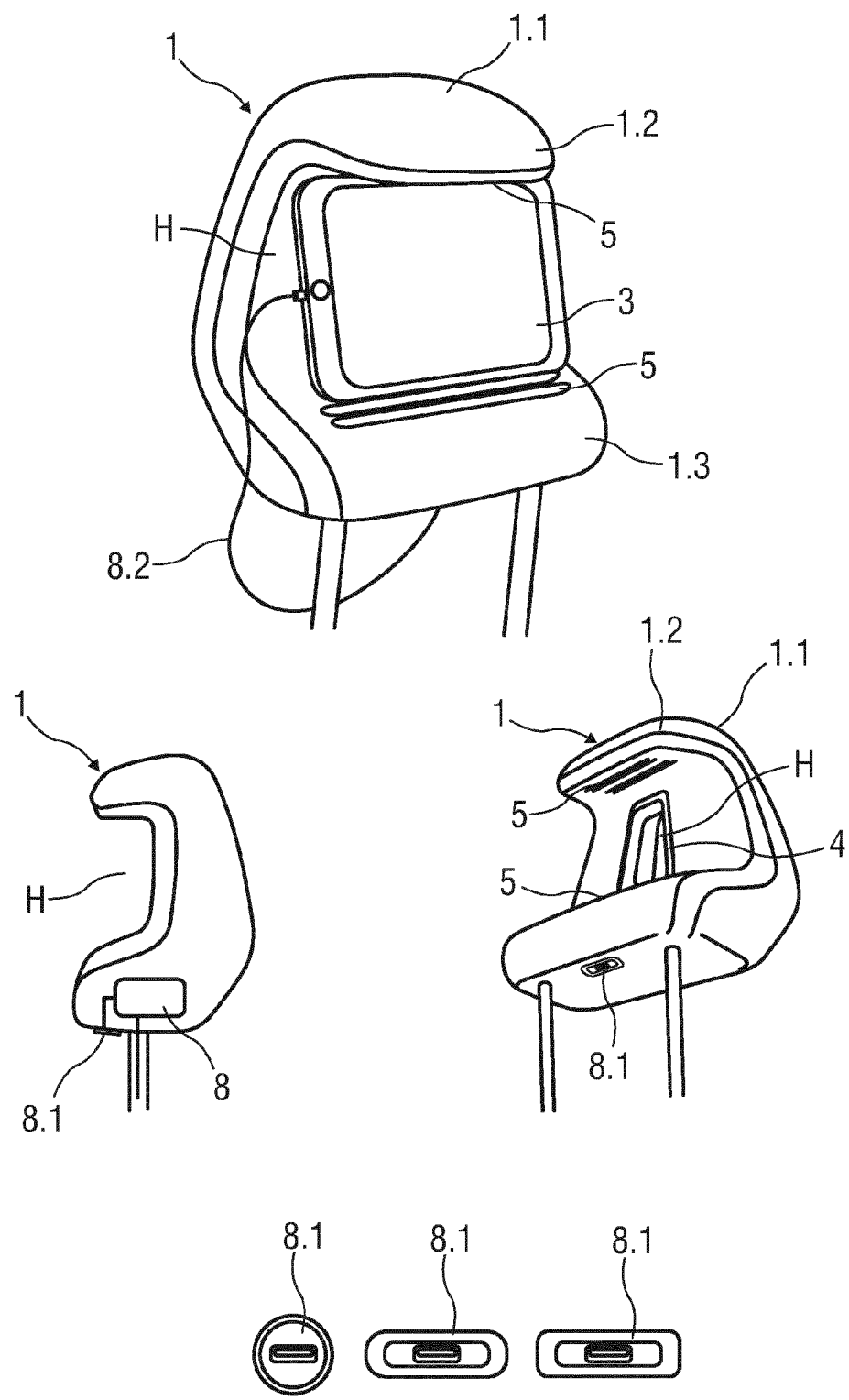
FIG. 21 is schematic perspective views of an eleventh exemplary embodiment of a headrest.

FIG. 21 illustrates a further exemplary embodiment of the headrest 1 in various views. An electric supply structure 8 which has a connection socket 8.1 for the connection of a network cable 8.2 of the object 3 to an electric energy source is additionally integrated in the headrest 1. The connection socket 8.1 has, for example, the "USB Standard".

Figure 22:
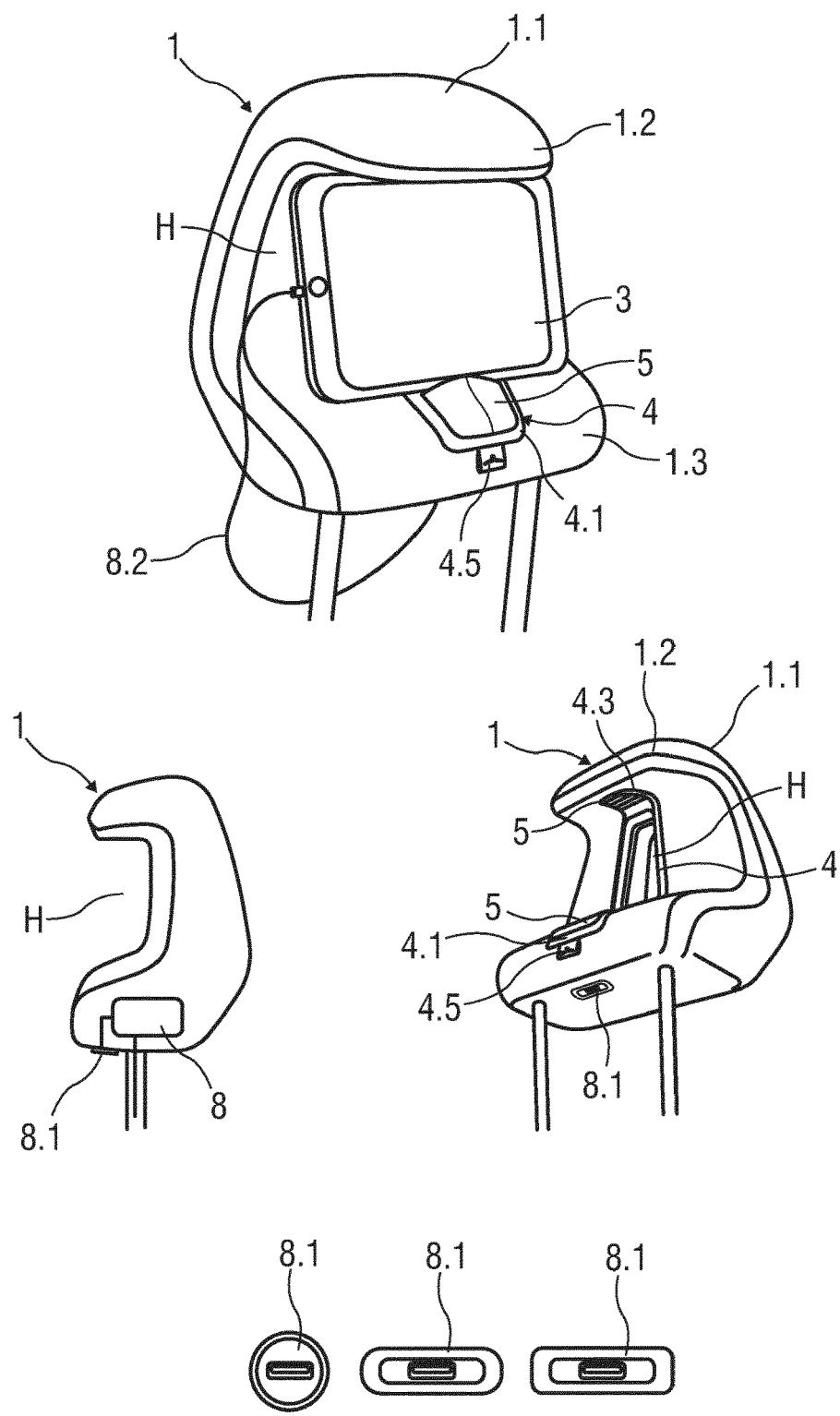
FIG. 22 is schematic perspective views of a twelfth exemplary embodiment of a headrest.

FIG. 22 shows a further exemplary embodiment of the headrest 1 in various views. In contrast to the exemplary embodiment illustrated in FIG. 21, the holding device 5 is formed by the formation of an edge in the lower portion 4.1 of the add-on part 4 and by a plurality of web-like structures which run parallel next to one another and substantially perpendicularly to the C-shaped cross section, are formed in particular from rubber or plastic and are attached in the upper portion 4.3 of the add-on part 4.

Figure 23:
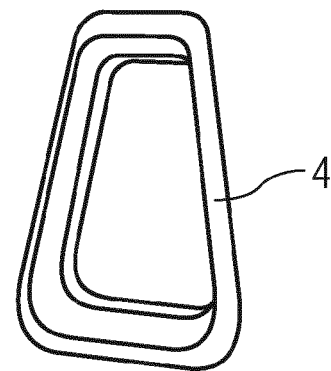
FIG. 23 is schematic perspective views of three exemplary embodiments of an add-on part for a headrest.
Figure 23:
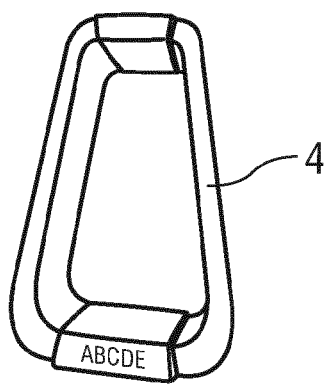
Figure 23:
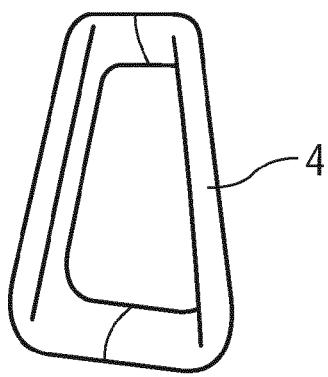
Figure 24:
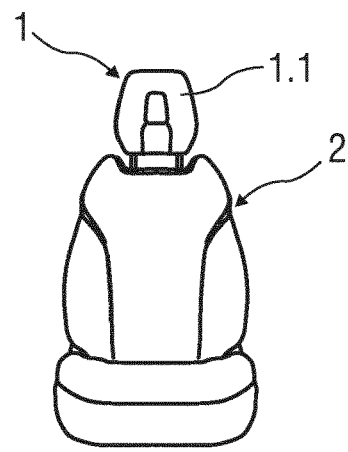
FIG. 24 is schematic views of a plurality of exemplary embodiments of a vehicle seat with a headrest.
Figure 24:
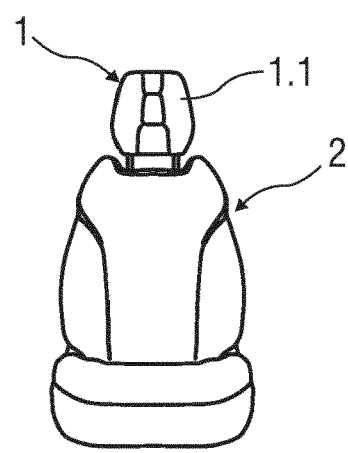
Figure 24:
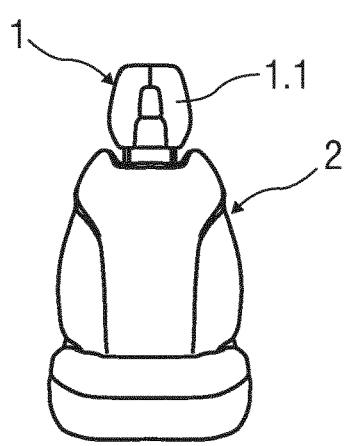
Figure 25:
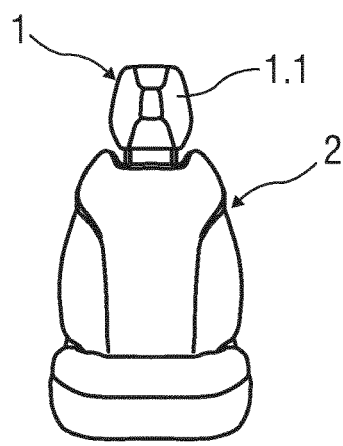
FIG. 25 is schematic views of a plurality of exemplary embodiments of a vehicle seat with a headrest.
Figure 25:
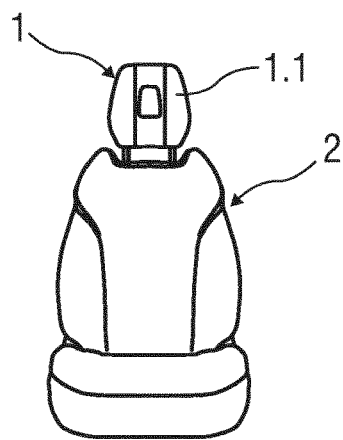
Figure 25:
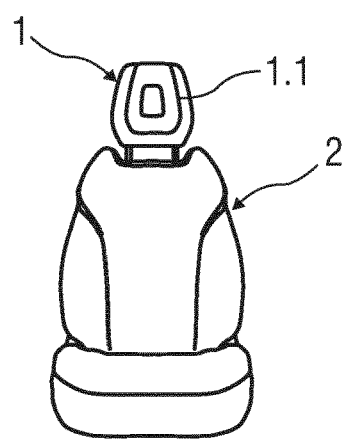
Figure 26:
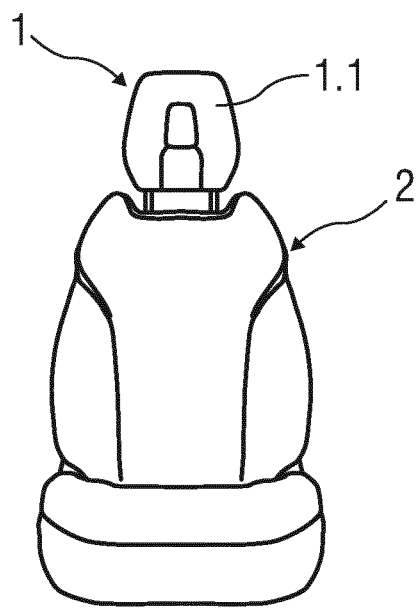
FIG. 26 is schematic views of an exemplary embodiment of a vehicle seat with a headrest.
Figure 26:
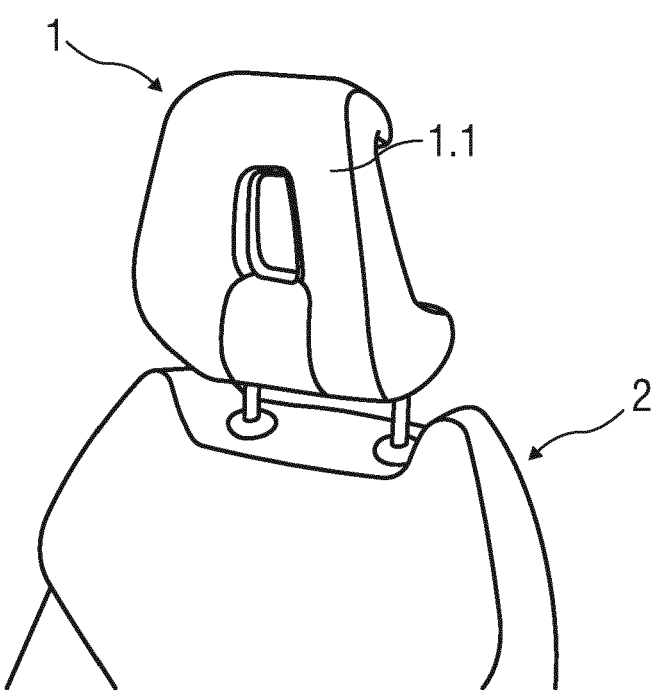
Figure 27:
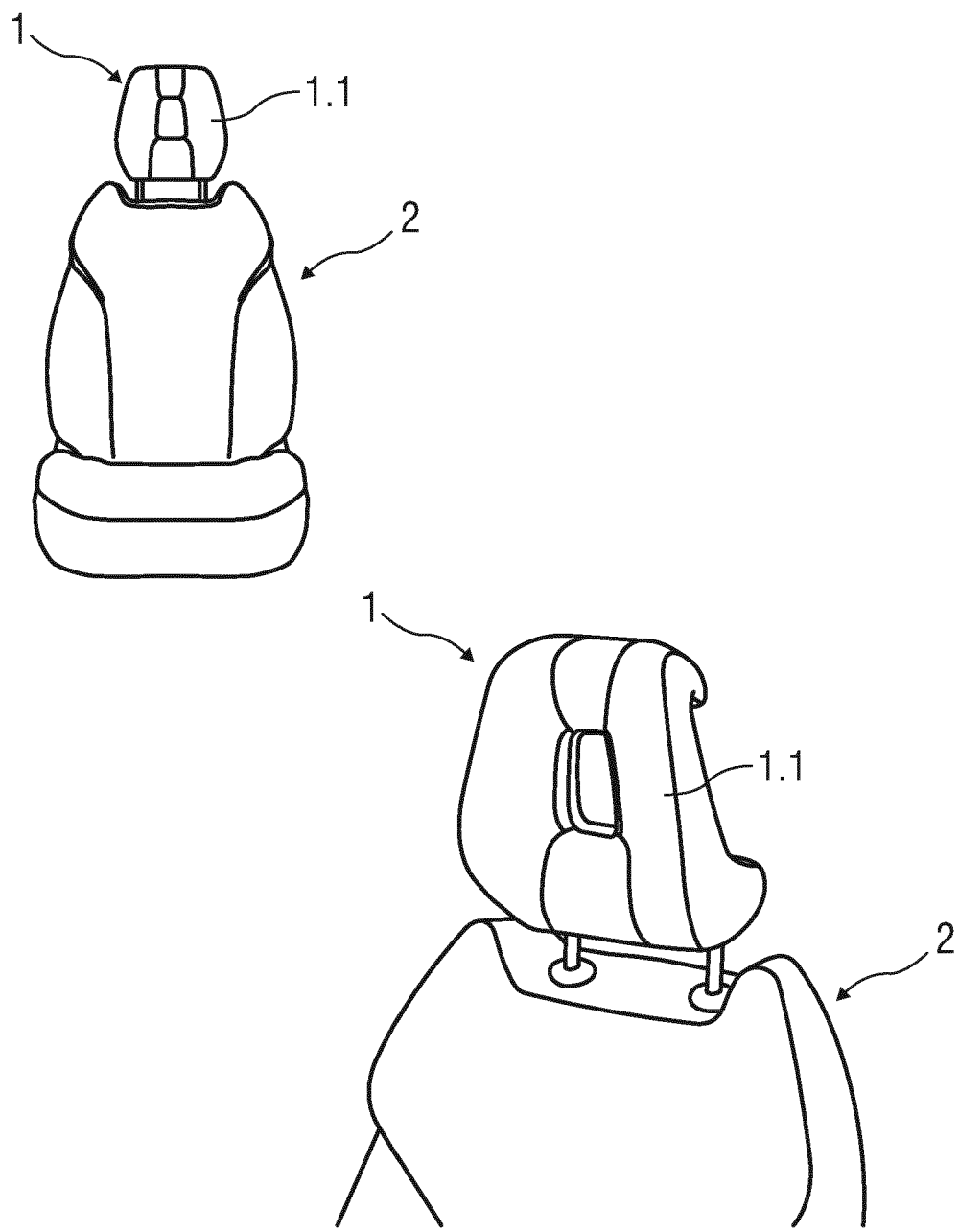
FIG. 27 is schematic views of an exemplary embodiment of a vehicle seat with a headrest.
Figure 28:
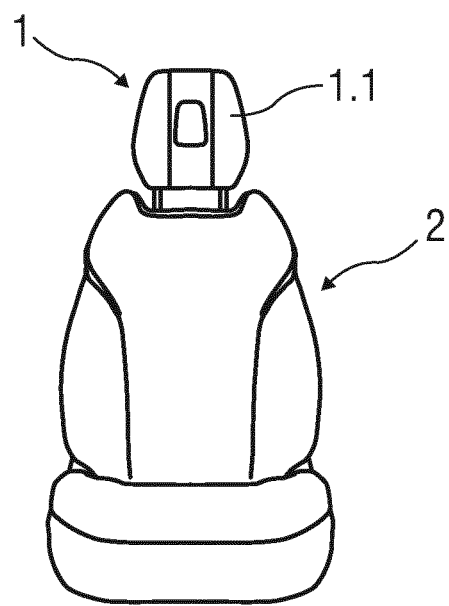
FIG. 28 is schematic views of an exemplary embodiment of a vehicle seat with a headrest.
Figure 28:
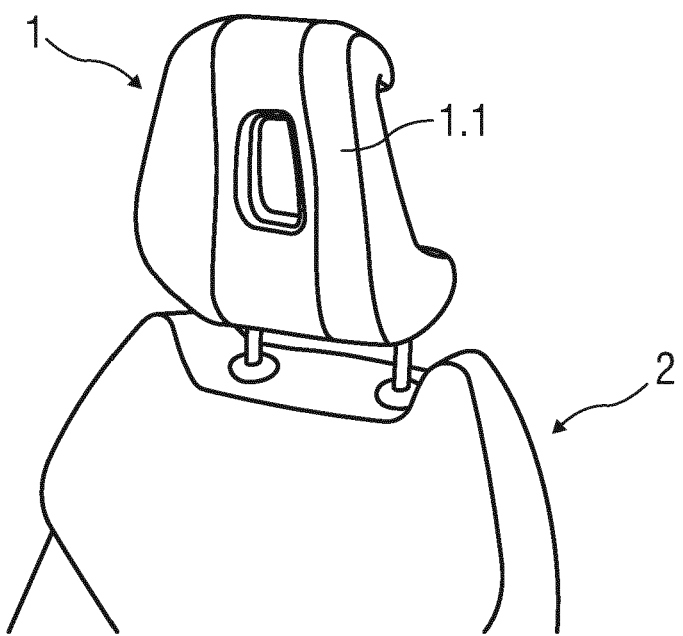
Figure 29:
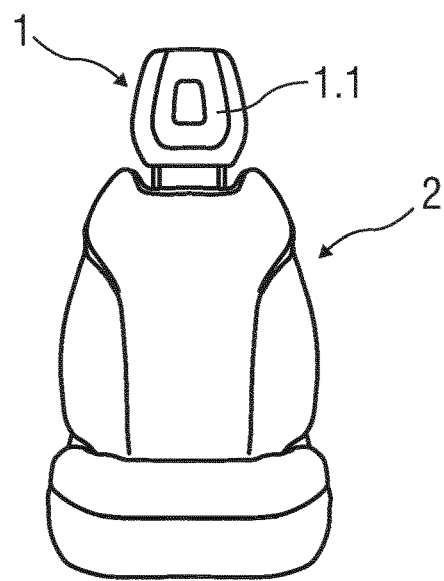
FIG. 29 is schematic views of an exemplary embodiment of a vehicle seat with a headrest.
Figure 29:
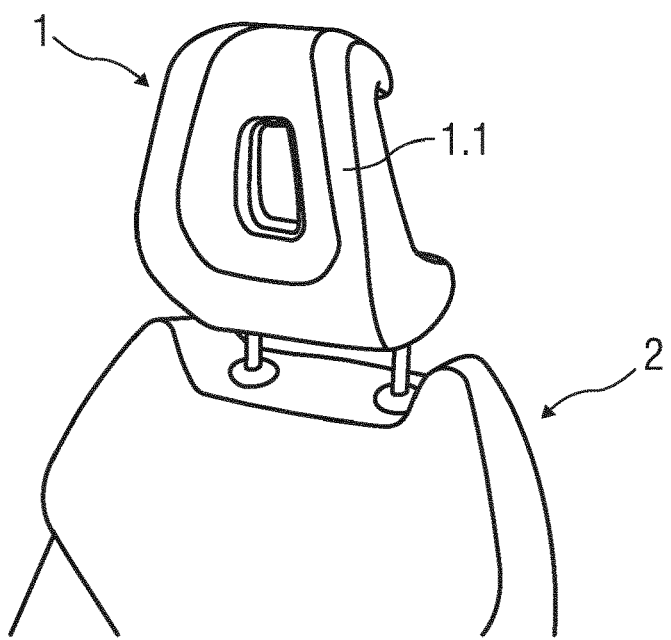

FIG. 23 shows various perspective views of three exemplary embodiments of the add-on part 4 for a headrest 1, wherein the add-on part 4 does not have a holding function.

FIGS. 24 to 29 illustrate various views of a plurality of exemplary embodiments of the vehicle seat 2 with a headrest 1.

While specific embodiments of the invention have been shown and described in detail to illustrate the application of the principles of the invention, it will be understood that the invention may be embodied otherwise without departing from such principles.

The invention claimed is:

1. A headrest for a vehicle, comprising a headrest body, wherein:
   the headrest body has a substantially C-shaped cross section having limbs;
   a holding device for holding at least one object is arranged within a cavity partially enclosed by the C-shaped cross section;
   the holding device is formed by one molded portion or a plurality of molded portions of the headrest body or by at least one mechanically flexible portion of the headrest body, or by one molded portion or a plurality of molded portions of the headrest body and by at least one mechanically flexible portion of the headrest body;
   the headrest body is configured such that the at least one object is holdable by clamping between the limbs of the C-shaped cross section; and
   the holding device is configured to hold the at least one object such that a first lateral side and a second lateral side of the at least one object is not covered by a portion of the headrest body.

2. The headrest as claimed in claim 1, wherein the holding device comprises at least one elongate depression introduced into at least one portion of the headrest body, the elongate depression running substantially perpendicularly to the C-shaped cross section.

3. The headrest as claimed in claim 1, wherein the holding device comprises elongate depressions introduced into at least one portion of the headrest body, the elongate depressions running substantially perpendicularly to the C-shaped cross section and substantially parallel to one another.

4. The headrest as claimed in claim 1, wherein the holding device comprises at least one fastening structure attached to at least one portion of the headrest body.

5. The headrest as claimed in claim 4, wherein the fastening structure comprises a web structure or a stud structure or both a web structure and a stud structure.

6. The headrest as claimed in claim 4, wherein the fastening structure comprises web structures or stud structures, or both web structures and stud structures, running parallel next to one another and substantially perpendicularly to the C-shaped cross section.

7. The headrest as claimed in claim 1, wherein part of the holding device is formed by an add-on part fastened to the headrest body.

8. The headrest as claimed in claim 7, wherein the add-on part comprises or forms at least one edge running substantially perpendicularly to the C-shaped cross section.

9. The headrest as claimed in claim 8, wherein the edge is formed on an actuable button in an unactuated state.

10. The headrest as claimed in claim 7, wherein the add-on part comprises at least one positioning element.

11. The headrest as claimed in claim 1, wherein the headrest body comprises a headrest body portion arranged between the limbs, the headrest body portion comprising an arcuate outer surface, each of the limbs extending outward of the headrest body portion in a rearward direction of the headrest body.

12. The headrest as claimed in claim 1, wherein the holding device and the headrest body are open on a front side, a first lateral side and a second lateral side.

13. The headrest as claimed in claim 12, wherein the holding device and the headrest body are configured to receive the at least one object from one of the first lateral side and the second lateral side.

14. The headrest as claimed in claim 1, wherein each of the limbs comprises an arcuate surface.

15. The headrest as claimed in claim 1, wherein the limbs are clamping limbs.

16. A headrest for a vehicle, comprising a headrest body, wherein:
    the headrest body has a substantially C-shaped cross section having limbs;
    a holding device for holding at least one object is arranged within a cavity partially enclosed by the C-shaped cross section;
    the holding device is formed by one molded portion or a plurality of molded portions of the headrest body or by at least one mechanically flexible portion of the headrest body, or by one molded portion or a plurality of molded portions of the headrest body and by at least one mechanically flexible portion of the headrest body;
    the headrest body is configured such that the at least one object is holdable by clamping between the limbs of the C-shaped cross section;
    the holding device and the headrest body are open on a front side, a first lateral side and a second lateral side; and
    the holding device and the headrest body are configured to receive the at least one object from one of the first lateral side and the second lateral side.

* * * * *